(12) United States Patent
Saunders

(10) Patent No.: US 6,642,967 B1
(45) Date of Patent: Nov. 4, 2003

(54) VIDEO DATA FORMATTING AND STORAGE EMPLOYING DATA ALLOCATION TO CONTROL TRANSCODING TO INTERMEDIATE VIDEO SIGNAL

(75) Inventor: Nicholas Ian Saunders, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 342 days.

(21) Appl. No.: 09/712,467

(22) Filed: Nov. 14, 2000

(30) Foreign Application Priority Data

Nov. 16, 1999 (GB) ............................................. 9927115

(51) Int. Cl.⁷ ............................. H04N 9/64; H04N 7/12
(52) U.S. Cl. .................. 348/714; 348/716; 375/240.26
(58) Field of Search ................................ 348/714, 715, 348/716; 375/240.12, 240.26, 240.29; H04N 9/64, 7/12

(56) References Cited

U.S. PATENT DOCUMENTS 6,456,340 B1 * 9/2002 Margulis .................... 348/745

FOREIGN PATENT DOCUMENTS

| EP | 0677969 | 10/1995 |
|----|---------|---------|
| EP | 0705041 | 4/1996 |
| EP | 967805 A | * 12/1999 |
| JP | 2000341686 A | * 12/2000 |

* cited by examiner

Primary Examiner—Sherrie Hsia
(74) Attorney, Agent, or Firm—Frommer Lawrence & Haug LLP; William S. Frommer; Glenn F. Savit

(57) ABSTRACT

Video data formatting apparatus and method in which an input signal is converted (transcoded) into an intermediate compressed video signal, where the intermediate compressed video signal has a GOP format in which each GOP contains fewer pictures than a GOP associated with the input video signal. A metadata signal which indicates data defining coding decisions is derived from the input video signal. A data quantity allocation is generated to control the transcoding into the intermediate video signal, whereby each picture of the intermediate video signal is transcoded so as not to exceed a respective data quantity allocation.

16 Claims, 3 Drawing Sheets

VIDEO DATA FORMATTING AND STORAGE EMPLOYING DATA ALLOCATION TO CONTROL TRANSCODING TO INTERMEDIATE VIDEO SIGNAL

BACKGROUND OF THE INVENTION

1. Field of the Invention

This invention relates to video data formatting and storage.

2. Description of the Prior Art

A video data storage system has been proposed in which an input video signal having a so-called "long GOP" format (i.e. a group of pictures format related to the MPEG format, involving P and/or B frames) is stored as an I-frame only signal. The stored signal is then returned to the long-GOP form for output.

As well as storing the I frame data (which allows frame-accurate editing of the video signal) some extra data or metadata associated with the video signal could be stored as well. The metadata could provide information about how the signal was coded in long GOP form and so could be used to assist the output encoder to give better results when the long GOP output signal is generated.

Two example possibilities for the metadata are: (a) the coding decisions used in generating the long GOP data, for example, vectors, Q (quantization parameter) values etc., or (b) the actual long GOP bitstream itself. In case (a), the coding decisions would guide the output encoder to make similar or identical decisions to generate the output long GOP bitstream, and in case (b), when no editing has taken place the original long GOP data could be output directly so that an I-frame to long GOP recoding process is needed only at or near to edit points.

Of course, in either case (a) or case (b), the amount of metadata concerned can be highly variable.

In case (a), the amount of data representing the coding decisions can vary from frame to frame. Apart from any other reason, an I frame does not usually have any associated vectors, a P frame has one set of vectors and a B frame may have two sets.

In case (b), the number of bits per frame or per GOP of a long GOP bitstream is not generally regulated to a fixed amount, but instead is controlled in the MPEG system by the fullness of a so-called "virtual buffer", an average desired data rate over time and by the difficulty of encoding the picture content itself. So, the quantity of data can vary dramatically from frame to frame. Also, it is very difficult to synchronise to the long-GOP data on a frame-by-frame basis.

In contrast, the I frame data recorded by the video data storage system is generally set up to aim towards a fixed data amount per frame. This is particularly important in a tape-based system where the capacity of the storage medium is strictly limited. If any metadata is recorded, the amount of metadata allocated to each I-frame must be subtracted from the available data capacity per I-frame to give a remaining target data amount for the Iframe.

The problem therefore is to store the variable-size metadata within a fixed data allocation per I-frame, and to do so in a manner which allows synchronism between the metadata and the frames of the stored I-frame signal.

Two possibilities for handling this problem are therefore:
(i) to record an average amount of either the coding decision data (a) or the long GOP data (b) with each frame of I-frame data. This gives a predictable data quantity remaining for each I frame. This scenario is shown schematically in FIG. 1 of the accompanying drawings, in which each fixed-size data allocation 10 contains a predetermined quantity of I-frame data 20 and a predetermined quantity of metadata 30. However, this means that the data recorded with each I-frame recorded by the video data storage system may bear no relation to the particular image represented by that I-frame.

(ii) to record data actually associated with each I frame alongside that I frame. This is only really possible for the decision data (a), as there is not an easily derivable relationship between long-GOP data (b) and individual frames of the video signal. This scenario is illustrated schematically in FIG. 2 of the accompanying drawings, in which each fixed size data allocation 10 contains a variable quantity of I-frame data 22 and a variable, complementary, quantity of metadata 32. This proposal means that there is a good correlation between metadata and the I-frame data if the signal is cut or otherwise edited. However, it requires the target bit rate for each I-frame to be altered from I-frame to I-frame. Also, because the amount of data varies dramatically, some I-frames may be left with insufficient data capacity for adequate coding.

In summary, there is a need for a formatting and/or storage arrangement which allows variable-length metadata which may, for example, comprise or be derived from a long GOP encoding of a video signal.

SUMMARY OF THE INVENTION

This invention provides video data formatting apparatus for formatting video data representing successive pictures for a data handling channel having a predetermined data capacity per picture, the apparatus comprising:

means for receiving an input video signal representing successive pictures, the input video signal having associated with it at least data defining at least some of the coding decisions made during an encoding of pictures represented by the input video signal into a compressed form having group-of-pictures (GOP) format including at least one inter-picture encoded picture;

means for converting the input video signal into an intermediate compressed video signal, the intermediate compressed video signal having a GOP format in which each GOP contains fewer pictures than a GOP associated with the input video signal;

means for deriving a metadata signal from the input video signal, the metadata signal indicating at least the data defining at least some of the coding decisions;

means for generating a data quantity allocation to control the transcoding into the intermediate video signal, whereby each picture of the intermediate video signal is transcoded so as not to exceed a respective data quantity allocation, in which the generating means calculates the data quantity allocation for each picture to be substantially equal to:

the predetermined data capacity per picture
less
the quantity of metadata for the input video signal GOP containing that picture divided by the number of pictures (n) in that input video signal GOP.

Further respective aspects and features of the invention are defined in the appended claims.

The invention is particularly applicable to a system in which the intermediate compressed video signal has a GOP format comprising only intra-picture encoded pictures.

Preferably the apparatus comprises means for generating data packets (e.g. for recording on a storage medium such as a tape medium) each comprising: an encoded picture of the intermediate compressed video signal; and a substantially I/n portion of the metadata signal associated with the input video signal GOP from which that picture was derived.

In embodiments of the invention, the solution provided to the problem described above is to determine the quantity of metadata—for example, of type (a) or (b)—associated with a particular GOP of the long GOP signal, and then to record that metadata in substantially equal segments with each of the I-frames corresponding to that GOP.

This allows the metadata and I-frame data to be associated with one another on a GOP by GOP basis. The start of each GOP of metadata can be established by standard synchronising codes within a GOP.

This solution recognises that long-GOP metadata of either type is close to useless if an edit has been made during the GOP, so there is no point having a correlation frame by frame. It also allows the target bit rate to be set once for all of the frames corresponding to a GOP.

The intermediate video signal preferably comprises only I-frames, for convenience of editing. This would generally imply a GOP length of 1, though that need not always be the case.

Preferably the metadata is formatted to the intermediate video signal in such a manner that it is resynchronised at GOP boundaries—in the preferred embodiments these would be boundaries of the long-GOPs, but in a system where the two GOP lengths shared a common multiple it would take place at instances of that common multiple of pictures.

In some embodiments, the input video signal need not be a compressed signal but may instead have been compressed at some other processing stage. The metadata signal could indicate at least a quantization parameter used in encoding each picture of the input video signal. Alternatively, or indeed in addition, the metadata signal indicates at least a set of motion vectors used in encoding each picture of the input video signal. Of course, notwithstanding that these conditions would in fact be fulfilled by a substantially entire compressed video signal, the metadata can itself be the compressed input video signal.

The input video signal could be in an uncompressed "baseband" form and have associated with it (for example) a set of coding decisions relevant to its encoding into a compressed form, in which case the metadata signal is derived from the video signal by extracting it from the associated data. However, in a preferred embodiment the input video signal is a compressed video signal in accordance with the associated GOP format.

For convenience of operation of the apparatus and the division of metadata between pictures of the intermediate video signal, it is preferred that the number of pictures in each GOP of the intermediate video signal and the number of pictures in each GOP associated with the input video signal have a common multiple under 61. More specifically, it is particularly convenient if the number of pictures in each GOP of the intermediate video signal is a factor of the number of pictures in each GOP associated with the input video signal, as this allows an easier allocation of the metadata.

The invention is particularly applicable to use in video data storage apparatus comprising formatting apparatus as defined above; and a storage medium for storing the intermediate video signal and the associated metadata signal. At the output of such apparatus a video signal in the same GOP format as that associated with the input video signal is preferably generated, using the metadata if possible or appropriate.

In the case where the metadata is effectively a compressed video signal itself, this can in some circumstances be used as the output signal, so avoiding any quality loss or artefacts from the coding and decoding of the intermediate video signal. However, this cannot be done if an edit has taken place or if the metadata has been corrupted through, for example, data loss (detectable using a conventional error correcting code). In order to handle the possibility of an edit interrupting a GOP of the metadata, it is preferred that the storage apparatus means for detecting whether an edit operation has taken place within a predetermined number of pictures of a current picture; and, if not, for using the metadata signal as the output compressed video signal.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 3:
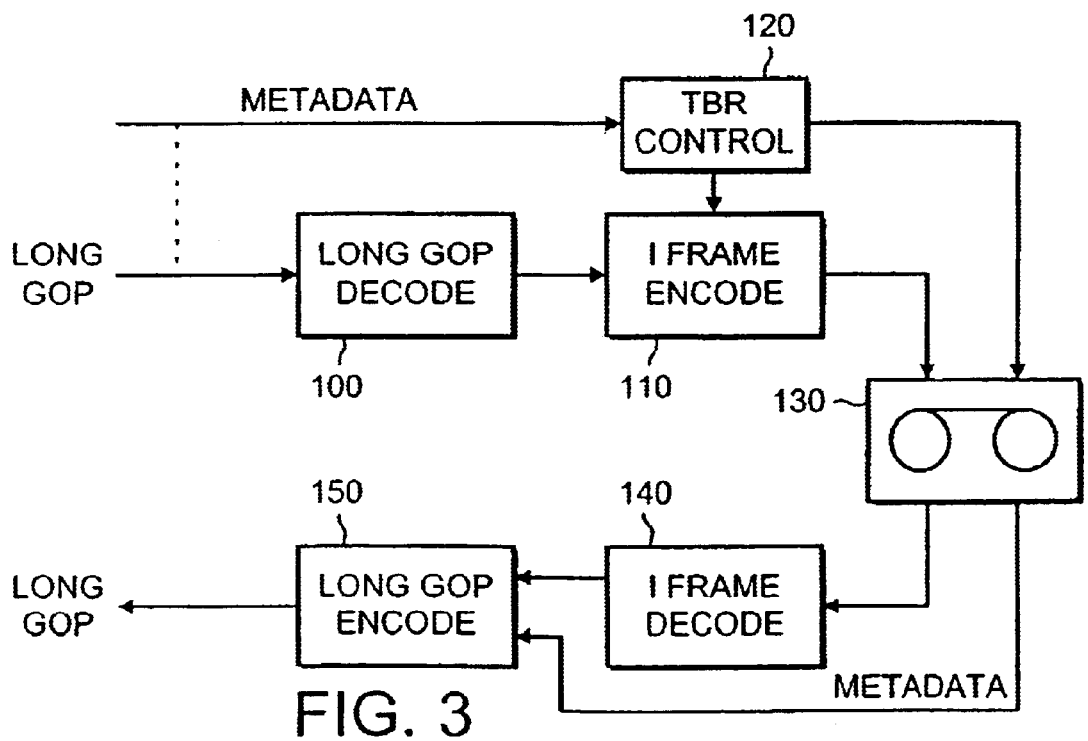
FIG. 3 schematically illustrates a video data storage system according to an embodiment of the invention.

FIG. 3 schematically illustrates a video data storage system according to an embodiment of the invention. The system comprises a long GOP decoder 100, an I frame encoder 110, a TBR controller 120, a tape transport 130, an I frame decoder 140 and a long GOP encoder 150.

The video data storage system is arranged to receive a video signal in a long GOP format but to store it on a tape medium in an I frame format. This allows frame-accurate editing of the video signal in a studio environment. The long GOP format may be, for example, a 15 frame format such as IBBPBBPBBPBBPBB, although the term "long GOP" here means no more than a GOP length greater than that used in the storage arrangement. In other embodiments the I frame storage format could be replaced by, for example, an IB format or the like. Generally it is better for the storage format to have a GOP length which is a factor of the GOP length of the long GOP signal, or at least that they have a common multiple under, say, 61 (60 being the lowest common multiple of 15 and 12 picture GOPs).

In addition to the I frame video data, the tape transport 130 also stores metadata. Two examples of the form of metadata are described here, although other types of metadata are applicable. The two examples to be described are: (a) data representing coding decisions used in originally generating the long GOP data, for example vectors, quantization parameter Q, DCT frame type, coded block pattern etc., or (b) the actual long GOP bit.stream itself. To cater for these two examples, the left hand top corner of FIG. 3 illustrates a solid line for receiving metadata of type (a) in parallel with the long GOP data, and a broken line showing that the metadata could in fact be the long GOP data itself.

The design decision on which type of metadata to use may depend upon the nature of the long GOP data itself. For example, in a system in which the tape transport 130 has a data capacity of 140Mbps (million bits per second), a long GOP bit stream of 51Mbps may be considered to be too large, in that if the whole long GOP bit stream was recorded the impact on the space available for recording I frame data would be too extreme and the subjective quality of the I frame-encoded pictures would suffer too much. On the other hand, a long GOP bit stream of, say, 22Mbps might be considered an appropriate size for recording the whole of the long GOP bit stream as the metadata in accordance with example (b).

In either case, the long GOP input video signal is supplied to the long GOP decoder 100 where it is decoded to "baseband" (uncompressed) video. The uncompressed video is then re-compressed by the I frame encoder 110.

The encoding by the I frame encoder 110 takes place in accordance with a target data quantity ("TBR") set by the TBR controller 120. The operation of the TBR controller 120 will be described below with reference to FIG. 4, but in brief it determines how much space is needed for the metadata and allocates the remainder to the I frame encoder. The I frame encoder is of a generally conventional type in which factors such as a quantization parameter may be varied from block to block within each picture to ensure that a target data quantity is not exceeded.

The metadata and I frame data are then recorded on the tape transport 130. The formatting of the two data items will be described below with reference to FIGS. 5 and 7.

On replay, which may or may not take place after an editing operation on the I frame data, the I frame data and metadata are recovered from the tape and demultiplexed into separate data streams.

The I frame data is decoded by the I frame decoder 140 into an uncompressed form. This uncompressed video signal, together with the metadata recovered from the tape, are supplied to the long GOP encoder 150.

If a decision has been made to use the entire long GOP bit stream as the metadata (case (b) described above), then reference is made to FIGS. 6a and 6b to describe the operation of the long GOP encoder 150. On the other hand, if coding decisions (a) are used instead, the operation of the long GOP encoder 150 is to re-encode the uncompressed video received from the I frame decoder into a long GOP format making as much use of the previous coding decisions as possible. Of course, if no editing has taken place, it should be possible to re-use the previous coding decisions substantially in their entirety. If editing has taken place, then at or near the edit points (perhaps within the GOP surrounding the edit points) fresh coding decisions will need to be derived.

A long GOP encoder which is capable of making use of previous coding decisions is described in GB9920276.4, a copy of which is placed on the file of the present application. The output of the long GOP encoder is the required long GOP bit stream.

Figure 4:
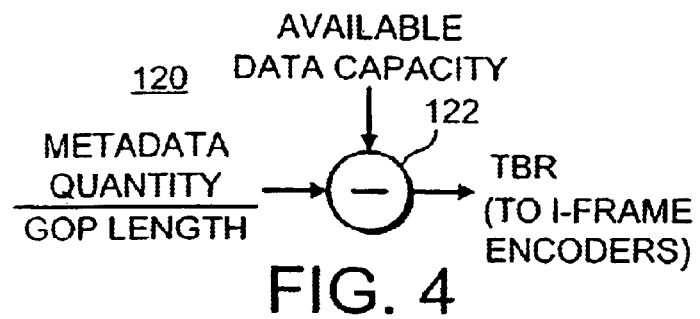
FIG. 4 schematically illustrates a compressed data quantity controller.

FIG. 4 schematically illustrates the operation of the TBR controller 120.

The TBR controller 120, in its most fundamental form, comprises a subtractor 122 which subtracts the quantity of metadata for each GOP, divided by the GOP length in pictures, from the available data capacity for each I frame. This generates a target data quantity TBR which is supplied to and controls the I frame encoder 110.

The variable defining the length of the metadata for each GOP may be available as part of the user bits or other accompanying data associated with the video signal. If it is not available in any other form, however, it can be obtained by employing a substantially 1-GOP delay at the input to the apparatus. Data buffered in the GOP delay can be examined to determine the metadata length for each GOP. Of course, as this is a variable quantity (though within limits imposed by the encoding algorithm), it is preferred to employ a delay sufficient to buffer the maximum possible GOP length.

Figure 5:
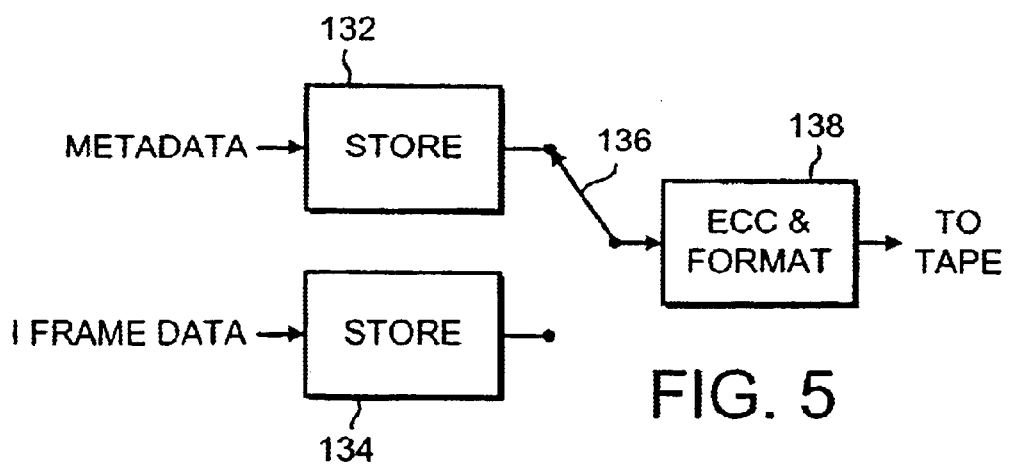
FIG. 5 schematically illustrates a data formatter.
Figure 7:
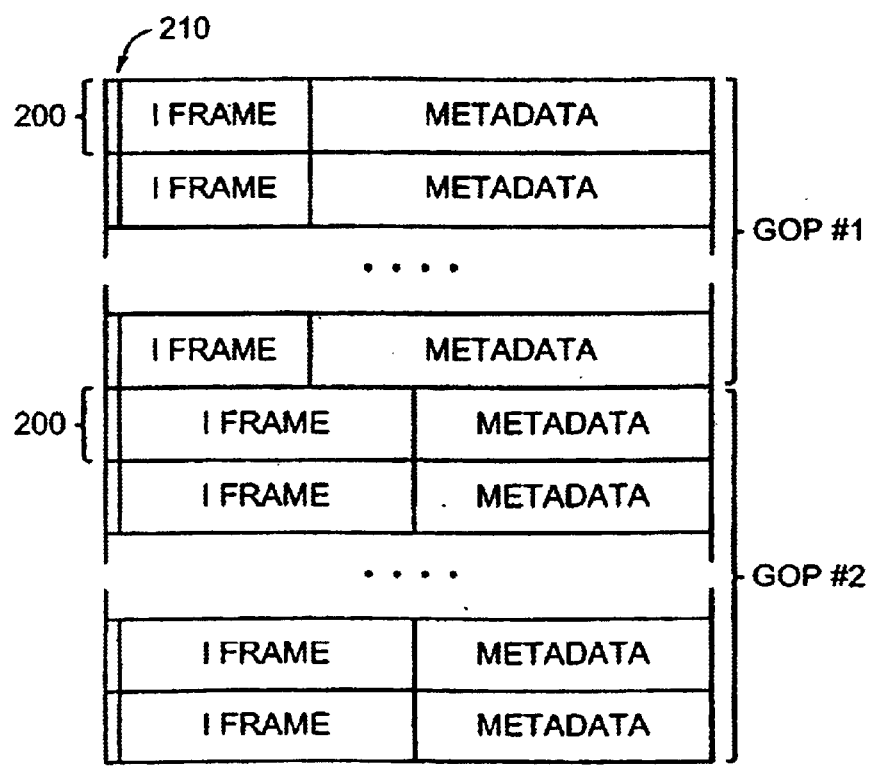
FIG. 7 schematically illustrates a data structure as recorded by the apparatus of FIG. 3.

FIG. 5 schematically illustrates the formatting of data to be placed onto the tape. Metadata and I frame data are received by separate memory stores, 132, 134 within the tape transport 130. A multiplexer 136 receives data from the stores 132 and 134 and supplies it to an error correction code generator and formatter 138 which formats the data into the required format for physically laying down on the tape. The allocation of data within a fixed-length data unit for recording is shown in FIG. 7 below.

Figure 6A:
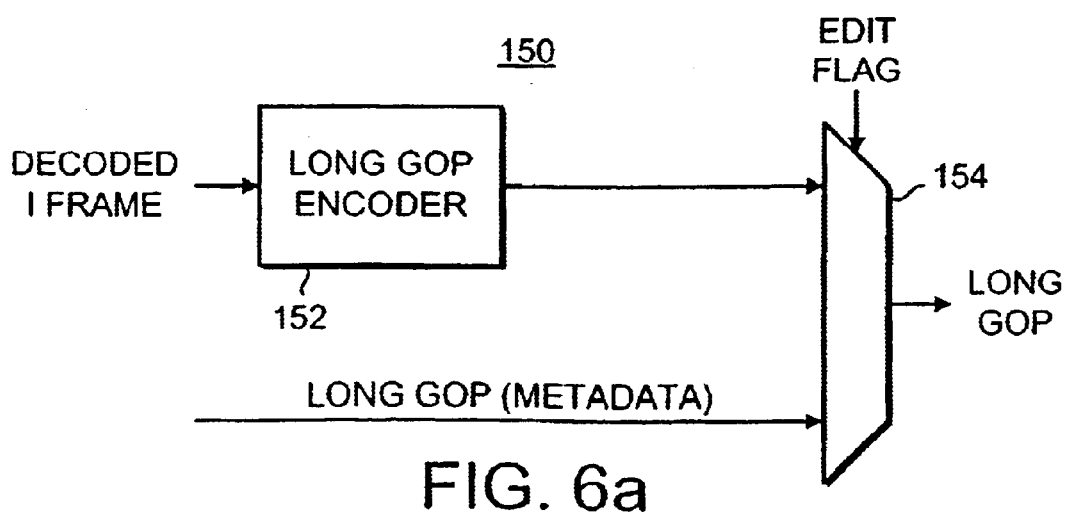
FIG. 6a schematically illustrates a long GOP encoder in a simplified form.

FIG. 6a schematically illustrates, in a simplified form, the long GOP encoder 150 in the case where the metadata is actually formed of the long GOP bit stream itself (case (b)). The uncompressed video signal received by decoding the I frame data is re-encoded by a long GOP encoding engine 152. The long GOP metadata is supplied along with the newly-encoded long GOP signal from the encoding engine 152 to a multiplexer 154 which operates under the control of an "edit" flag.

The edit flag is added to user data of the compressed video data when an edit operation takes place, for example being generated either by the tape transport 130 or by an editing apparatus itself. From the edit flag it can be determined whether an edit has been made at or near each picture stored on the tape transport 130—for example, within one GOP-length of the current picture.

If an edit has been made, then the long GOP metadata is no longer valid and so the newly-encoded data from the encoding engine 152 is used instead, and is routed to the output by the multiplexer 154. On the contrary, if no edit has been made, the long GOP metadata can actually be used as the output signal and so is routed to output by the multiplexer 154.

The system described with reference to FIG. 6a is simplified for the purposes of explanation, so a more detailed description will now be provided in connection with FIG. 6b.

The reason that the apparatus is preferably more complicated than the simple multiplexer or switch shown in FIG. 6a arises from three main reasons:

(i) that the I frames actually recorded are stored in a display order, whereas frames of the long GOP are arranged in a compression order. Long GOP compression using inter-frame encoded frames introduces dependencies between the compressed frames so that certain frames (e.g. I and P frames) have to be encoded before other frames (e.g. B frames) can be encoded. Similarly, at decoding, certain frames have to be decoded before others. So, the order of encoding and data transmission in a long GOP system is generally not the same as the display order.

(ii) that there is generally no fixed allocation of data capacity between the different frames of the GOP, so it is difficult or impossible to predict how much data of the long GOP bitstream needs to be retrieved in order to decode a particular number of frames of a GOP.

The effect of features (i) and (ii) is that some latency, or delay, has to be introduced to the switching system. Frames cannot be switched at any arbitrary frame boundary because the required frame might not yet be available in the bitstream. So, some or all of a decoded GOP has to be buffered for any switching system to operate. This latency means that it is possible to examine at least some, and possibly all, of a GOP to detect whether an edit flag has been set, before the switching operation has to be initiated.

(iii) that switching from one long GOP bitstream to another is not as simple as just stopping the one and starting the other. In fact, in many systems it is necessary to match the level of fullness of a "virtual buffer" as defined in the MPEG 2 specification. If the occupation of the virtual buffer is not matched very soon after a splice from one long GOP bitstream to another, it is possible for the transmission channel or a receiver buffer to overflow (causing loss of data) or underflow (causing a subjectively disturbing gap in the decoded video).

The last problem is specifically discussed and addressed in GB9920276.4 referred to above. That application deals primarily with splicing between two long GOP bitstreams, which is just the situation required here when a choice has to be made between the recovered metadata long GOP bitstream or a newly encoded long GOP bitstream by the encoding engine 152.

Figure 6B:
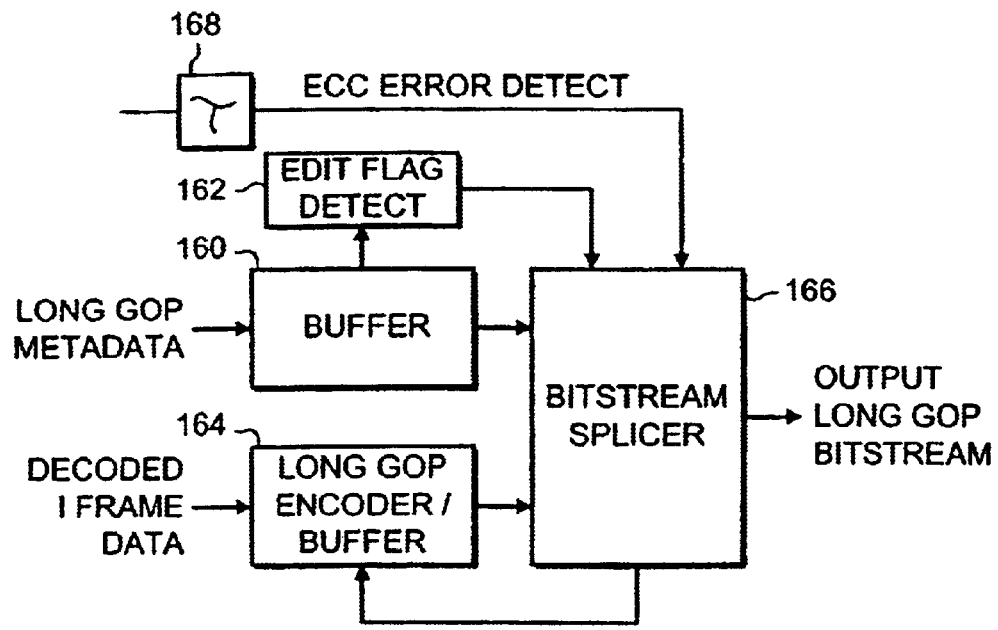
FIG. 6b schematically illustrates a more detailed version of a long GOP encoder.

Accordingly, FIG. 6b includes matter derived from GB9920276.4, and reference should of course be made to that application for further detail.

Referring to FIG. 6b, the long GOP bitstream recovered as the metadata signal is stored in a buffer 160. As described above, this allows for the latency needed to recover all of the frames in the correct order and to be sure of recovering the frames at any stage in receipt of the bitstream. In the present example, the buffer 160 is sized to accommodate one complete GOP of the long GOP bitstream.

An edit flag detector 162 detects the presence of an edit flag in user bits of the ata buffered in the buffer 160. If an edit flag is detected, this indicates that a switch hould be made to a newly encoded long GOP bitstream provided by a long GOP ncoding engine/buffer 164.

The encoding engine/buffer 164 acts on the decoded I frame data to generate a ong GOP bitstream having a GOP structure frame-aligned with and identical to that of the long GOP metadata. Part of this process will involve a degree of latency or delay, but if that is not sufficient to match the delay introduced by the buffer 160, further delay is included so that the two are identical.

A bitstream splicer 166 operates in accordance with the teaching of GB9920276.4 to splice between the two long GOP bitstreams while matching, at least soon after the splice, the virtual buffer occupancy. In doing this, the splicer may need to control the bit rate of the encoding engine 164 so a feedback path is drawn.

The splicing operation takes place under the control either of the edit flag detector, in other words in response to a detection of an edit in the current GOP, or in response to a data error indicator derived in a conventional way from the ECC (error correcting codes) used during the recording and replay process., If the ECC indicates data loss in the metadata bitstream, a splice to the newly encoded bitstream would be made for at least that GOP. A delay element 168 is provided in case the ECC information has to be delayed so as to correspond to the delayed video information.

An aspect of a long GOP bitstream splicer which is hinted at above is that it may take a certain period to match the virtual buffer occupancy after a splicing operation has taken place. Accordingly, it may be provided that splices, or possibly just splices from the newly encoded bitstream back to the metadata-derived bitstream, can be inhibited until the virtual buffer occupancy has been substantially matched after a preceding splice.

Of course, the operations described above could be implemented in hardware, custom circuitry such as an application specific integrated circuit (ASIC), software operating on a general purpose computer or a mixture of these. Such software and a storage medium carrying such software are considered to represent embodiments of the invention.

Figure 1:
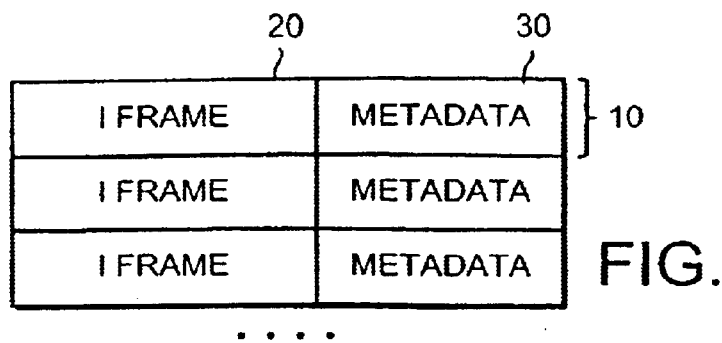
FIGS. 1 and 2 schematically illustrate unsatisfactory methods of dealing with variable length metadata in a video data storage system.
Figure 2:
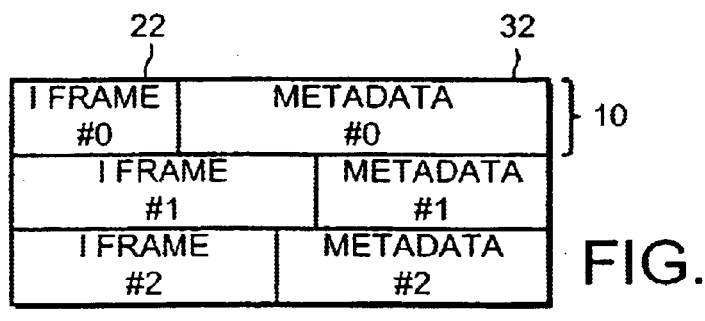

FIG. 7 is similar to FIGS. 1 and 2, though drawn on a different horizontal scale. It shows fixed-size data units 200 for recording on, for example, the tape medium. Within each data unit is the data representing an I frame and some metadata derived from the GOP containing the corresponding frame of the input (long GOP) video signal.

FIG. 7 illustrates frames from two GOPs of the input long GOP signal. It will be seen that the quantity of metadata associated with the two GOPs is different, but that within a GOP the metadata is divided substantially equally between I frames and is synchronised to the I frame signal at the GOP boundaries.

Header data 210 may also be included to specify, for example, the boundary between the I frame data and the metadata or to specify whether an editing operation has taken place at or near that frame (i.e. to act as the "edit flag" described above).

It will be appreciated that references to "frames" can be replaced by other definitions such as "picture" or "field". It will also be appreciated that the techniques are applicable to other types of storage arrangement such as magnetic or optical disk and the like. Indeed, the data need not even be stored, but could simply be formatted for handling by a data handling channel of nominally fixed capacity.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Video data formatting apparatus for formatting video data representing successive pictures for a data handling channel having a predetermined data capacity per picture, said apparatus comprising:

a signal input to receive an input video signal representing successive pictures, said input video signal having associated with it at least data defining at least some of a number of coding decisions made during an encoding of pictures represented by said input video signal into a compressed form having group-of-pictures (GOP) format including at least one inter-picture encoded picture;

a converter to convert said input video signal into an intermediate compressed video signal, said intermediate compressed video signal having a GOP format in which each GOP contains fewer pictures than a GOP associated with said input video signal;

a metadata generator to derive a metadata signal from said input video signal, said metadata signal indicating at least said data defining at least some of said coding decisions;

an allocation generator to generate a data quantity allocation to control transcoding into said intermediate video signal, whereby each picture of said intermediate video signal is transcoded so as not to exceed a respective data quantity allocation, in which said allocation generator calculates said data quantity allocation for each picture to be substantially equal to:
 (i) said predetermined data capacity per picture
 less
 (ii) a quantity of metadata for said input video signal GOP containing that picture divided by a number of pictures (n) in that input video signal GOP.

2. Apparatus according to claim 1, in which said intermediate compressed video signal has a GOP format comprising only intra-picture encoded pictures.

3. Apparatus according to claim 2, comprising means for generating data packets each comprising:
 (i) an encoded picture of said intermediate compressed video signal; and
 (ii) a substantially 1/n portion of said metadata signal associated with said input video signal GOP from which that picture was derived.

4. Apparatus according to claim 1, in which said metadata signal is substantially identical to that associated with said input video signal.

5. Apparatus according to claim 1, in which said metadata signal indicates at least a quantization parameter used in encoding each picture of said input video signal.

6. Apparatus according to claim 1, in which said metadata signal indicates at least a set of motion vectors used in encoding each picture of said input video signal.

7. Apparatus according to claim 1, in which said metadata signal indicates at least a DCT frame type used in encoding each picture of said input video signal.

8. Apparatus according to claim 1, in which said input video signal is a compressed video signal in accordance with said associated GOP format.

9. Apparatus according to claim 1, in which a number of pictures in each GOP of said intermediate video signal and a number of pictures in each GOP associated with said input video signal have a common multiple under 61.

10. Apparatus according to claim 9, in which said number of pictures in each GOP of said intermediate video signal is a factor of said number of pictures in each GOP associated with said input video signal.

11. Video data storage apparatus comprising:
 (i) formatting apparatus according to claim 1; and
 (ii) a storage medium for storing said intermediate video signal and said associated metadata signal.

12. Apparatus according to claim 11, comprising:
 (i) a signal retriever to retrieve said intermediate video signal and said metadata signal from said storage medium; and
 (ii) a transcoder to transcode said intermediate video signal into an output compressed video signal having a GOP format identical to that associated with said input video signal.

13. Apparatus according to claim 12, in which said metadata signal is substantially identical to that associated with said input video signal, said apparatus comprising:
 (i) a detector to detect whether an edit operation has taken place within a predetermined number of pictures of a current picture; and, if not, for using said metadata signal as said output compressed video signal.

14. A method of formatting video data representing successive picture for a data handling channel having a predetermined data capacity per picture, said method comprising the steps of:
 (i) receiving an input video signal representing successive pictures, said input video signal having associated with it at least data defining at least some of a number of coding decisions made during an encoding of pictures represented by said input video signal into a compressed form having group-of-pictures (GOP) format including at lest one inter-picture encoded picture;
 (ii) converting input video signal into an intermediate compressed video signal, said intermediate compressed video signal having a GOP format in which each GOP contains fewer pictures than a GOP associated with said input video signal;
 (iii) deriving a metadata signal from said input video signal, said metadata signal indicating at least said data defining at least some of said coding decisions;
 (iv) generating a data quantity allocation to control transcoding into said intermediate video signal, whereby each picture of said intermediate video signal is transcoded so as not to exceed a respective data quantity allocation, including calculating the data quantity allocation for each picture to be equal to:
  (i) said predetermined data capacity per picture
  less
  (ii) a quantity of metadata for said input video signal GOP containing that picture divided by a number of pictures (n) in that input video signal GOP.

15. A computer program having program code for carrying out a method according to claim 14.

16. A storage medium carrying a computer program according to claim 15.

* * * * *